May 3, 1949.  R. F. GOECKE  2,469,109
NONCORRODIBLE VALVE
Filed Dec. 6, 1943  2 Sheets-Sheet 1
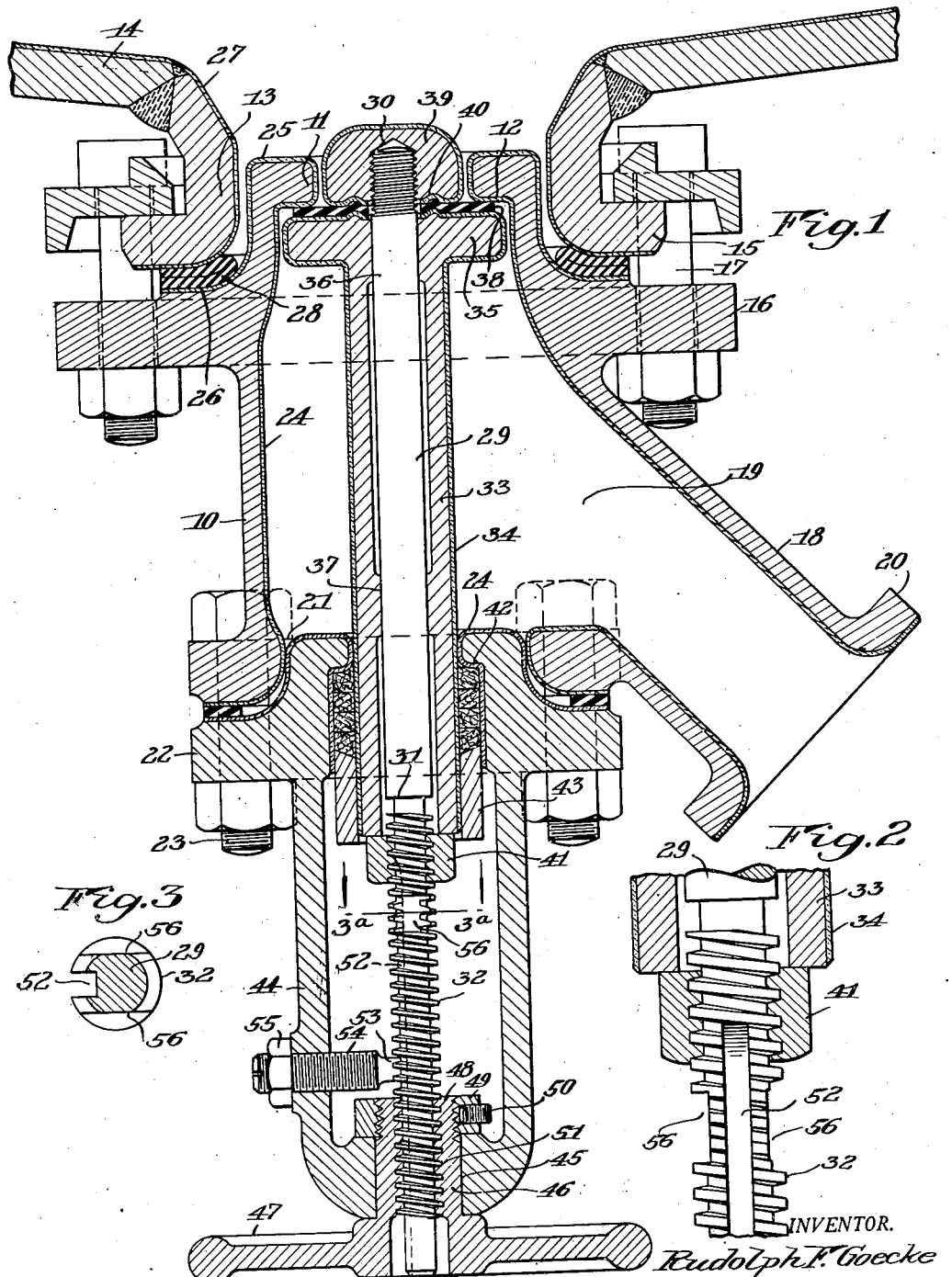
INVENTOR.
Rudolph F. Goecke
BY Cumpston и Shepard
his Attorneys

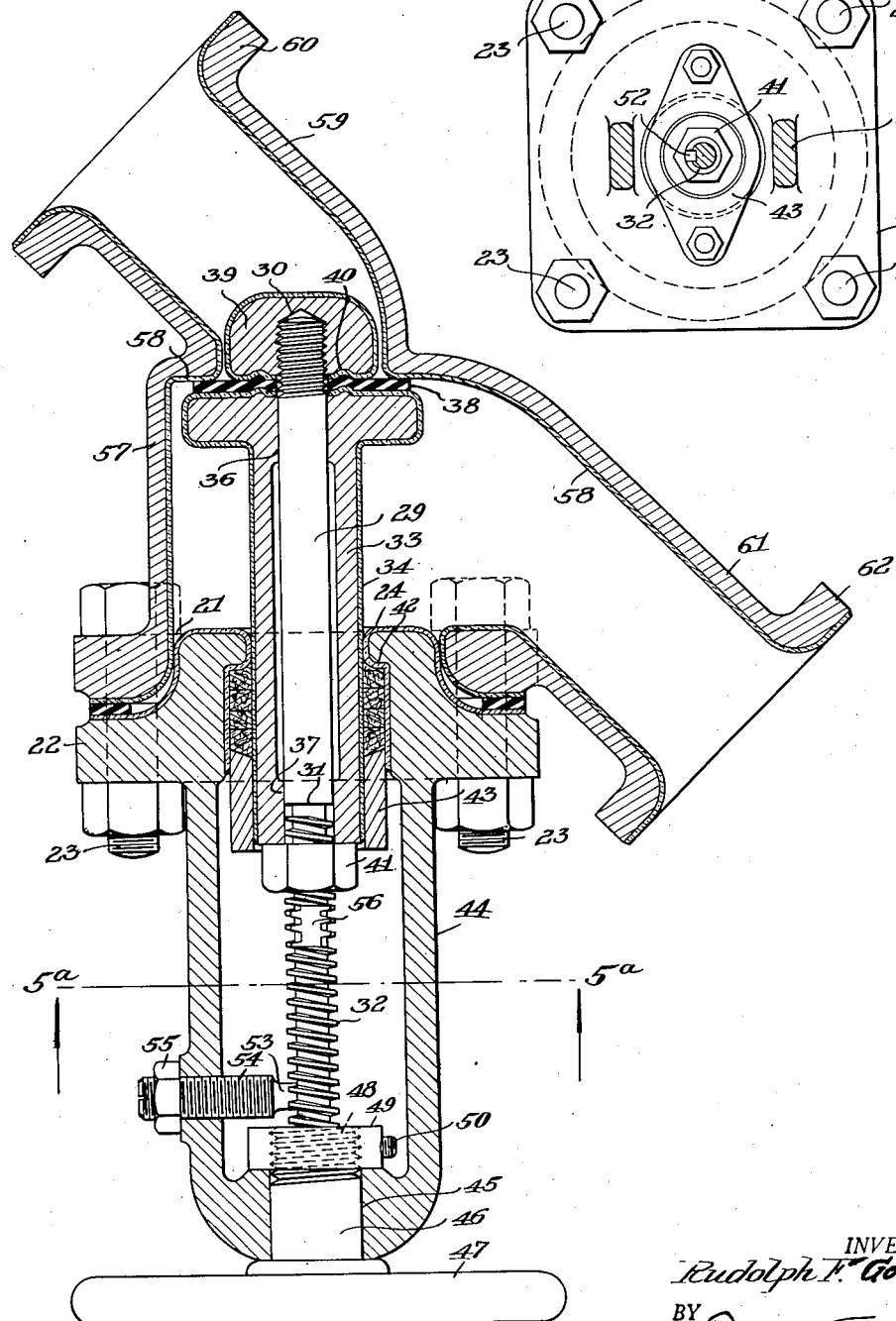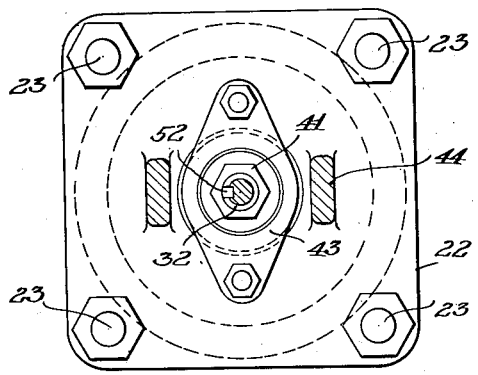

Patented May 3, 1949

2,469,109

UNITED STATES PATENT OFFICE 2,469,109

NONCORRODIBLE VALVE

Rudolph F. Goecke, Elyria, Ohio, assignor to The Pfaudler Co., Rochester, N. Y., a corporation of New York Application December 6, 1943, Serial No. 513,071

6 Claims. (Cl. 251—158)

This invention relates to valves for transmitting corrosive acid and alkaline liquids and gases, one object of the invention being to provide an improved and more efficient construction, having the corrosion-resisting qualities of vitreous materials, combined with the strength afforded by parts constructed of steel or other suitable metal.

Another object is to provide a valve such as described, having an improved stem construction which is effectively protected against corrosive attack, while adapted to be manufactured economically and with an ample degree of precision.

A further object is to provide a valve of the above character in which the valve head and seat portions are constructed of metal, with a vitreous protective coating, and with an interposed gasket of yieldable material to compensate for inequalities of the vitreous coating, without requiring excessive closing pressure between the mating surfaces.

Still a further object is to provide such a valve having improved stem mounting and operating means for moving the stem longitudinally to close the head and its yieldable gasket against the seat by a non-rotary, straight-line motion.

To these and other ends the invention resides in certain improvements and combinations of parts, all as will be hereinafter more fully described, the novel features being pointed out in the claims at the end of the specification.

In the drawings:

Fig. 1 is a sectional elevation of a valve of the flush type embodying the present invention, and shown as attached to a container outlet;

Fig. 2 is an enlarged, sectional view of a portion of the valve stem assembled, as seen from the left in Fig. 1;

Fig. 3 is an enlarged section on the line 3a—3a in Fig. 1;

Fig. 4 is a sectional elevation of a valve embodying the invention in a modified or straight-line construction, and Fig. 5 is a section on the line 5a—5a in Fig. 4.

The embodiment of the invention, herein disclosed by way of illustration, comprises, preferably, a metal valve housing 10 which, in the modification shown in Fig. 1 of the drawing, is of the so-called flush type adapted for connection with the flanged outlet of a container, or tank, so that the valve inlet and seat are located substantially flush with the tank outlet. The valve housing is thus formed at its inlet with an inwardly extending, annular shoulder portion 11, the inner radial surface 12 of which serves as the valve seat. The valve inlet extends, as shown, into the outlet 13 of the container or tank 14, so as to provide the same with a substantially flush outlet connection, as well understood in the art. The tank outlet is provided with the usual or any suitable flange 15 and the valve housing with a cooperating flange 16, the respective flanges being secured together by the usual or suitable bolts 17.

The valve outlet is formed by a connection 18, preferably branching from the valve chamber 19 at an angle of about 45° and provided with a flange 20 for attachment to the line to be controlled. The side of the housing opposite the seat opening is preferably formed with a stem opening 21 closed by a cover 22 secured to the housing as by means of bolts 23. The surfaces of the housing and its cover 22 which are subjected to contact with the transmitted fluids, are coated, as at 24, with a vitreous material, such as the known glass enamel or lining, for protecting the same against corrosive attack with the known efficiency of such lining materials. The coating 24 covers the seat 12 and is extended around the valve inlet, as at 25, and preferably down to and partly across the flange 16 as at 26. The container and its outlet are shown as having a similar coating 27, and a gasket 28 of rubber, lead or other known or suitable non-corrodible material, is interposed between the container and valve flange.

The valve stem and valve head assembly are similarly made of steel or other suitable metal with a vitreous coating and are specially constructed to facilitate manufacture with the desired precision and economy. It has been found that the application of a vitreous coating to a valve stem makes it difficult to properly hold and machine other portions of the stem, without injury to the coating. On the other hand, if the stem be first threaded or otherwise machined and then coated, the treatment at high temperature, which is a necessary step in the application of a vitreous coating, tends to produce small distortions in light metal parts so enameled and to produce a surface which lacks the evenness characteristic of machined or ground surfaces. In accordance with the present invention, to compensate for any distortion produced by the heat treatment, the valve stem assembly is constructed on an accurately machined backbone comprising a metal stem 29 having an accurately machined and uncoated surface. The end of the stem projecting adjacent the valve head is preferably threaded, as at 30, while the opposite end is somewhat reduced in diameter, as at 31, and provided with an elongated threaded part 32, for connection with the operating means, as hereafter described.

The metal stem or rod 29 is preferably enclosed and protected against corrosion in an elongated metal sleeve 33, the outer surface of which is provided with a vitreous coating 34. The sleeve is enlarged at one end by a substantial radial flange 35, forming the valve head, which is likewise coated and protected, as shown. The sleeve opening or bore is, for the most part, of somewhat larger diameter than the diameter of the stem rod 29 and is formed at longitudinally spaced points 36 and 37 with machined bearing surfaces, closely fitting the machined surfaces of the rod 29. The sleeve extends at its opposite end through a stuffing box in the cover 22, as hereafter described.

The valve 35 formed, as described, at one end of sleeve 33, is arranged to extend opposite the housing seat 12, as shown. The head is provided, however, with a replaceable gasket 38 of yieldable material, such as rubber, or a rubber-like substance, adapted to resist corrosive attack, to compensate for any unevenness in the surfaces of the valve head and seat and afford a tight closure of the valve, without excessive pressure on the parts and without requiring precision finishes of the coacting surfaces. The gasket is preferably held on the head by means of a metal cap 39 coated with vitreous material and threaded on the end 30 of the stem rod 29, so as to compress and hold the gasket on the head; the parts being suitably ribbed, as at 40, to afford a better grip on the gasket. This construction serves effectively to secure the gasket on the head for cooperation with the seat and also seals in and protects the end of the stem rod 29 and the interior of the sleeve 33. The sleeve is secured on the stem against the pressure of cap 39 by a nut 41 threaded on the stem rod 29 and bearing against the opposite end of the sleeve to resist the pressure of the cap 39.

To seal in the opposite end of the stem, its sleeve 33 extends through a stuffing box 42 formed in the housing cover 22 and filled with suitable packing material compressed by a follower or gland sleeve 43, the opposite ends of which are adjustably secured by bolt and nut means on the cover, in the same manner as illustrated in Fig. 5, and as well understood in the art. The packing seals in the fluids transmitted by the valve, and the stem sleeve 33 and the cover 22 have their vitreous coatings extended through the stuffing box for full protection against corrosion.

For operating the valve, the housing is provided with a bonnet 44, in the end of which is formed a bearing 45, in which is rotarily mounted the hub 46 of a hand wheel 47, preferably having a solid flange construction, as shown, to prevent the engagement and turning thereof by an implement likely to apply excessive force. Hub 46 is machined for a running fit with the yoke and has an extended end 48, on which is threadedly engaged a nut 49, secured by a set screw 50, for holding the wheel against movement longitudinally of the valve stem. The hand wheel hub is formed with a threaded bore 51, in which is received the threaded end 32 of the stem. The portion of the stem within the yoke is formed with a longitudinally extending key slot 52 for cooperation with a key 53 formed on the end of a stud 54 adjustably threaded in an opening in the yoke and locked as by means of a nut 55. The stem may be slabbed off on opposite sides, as at 56, for the reception of a wrench, or other tool, for holding the stem against rotation during the assembly of the parts.

It will be apparent from the above description that rotation of the hand wheel 47 serves to move the valve stem assembly longitudinally, without rotation, so that the head 35 and its gasket 38 are moved to and from engagement with the seat 12 by a straight-line motion, thus economically limiting the wear on the gasket and also on the stem sleeve as it moves through the packing of the stuffing box. The soft gasket 38 prevents damage to the glass coated surfaces of the valve head and seat and affords a tight closure, without requiring any such pressure as would be likely to injure the surface coatings.

The modified construction shown in Fig. 4 comprises the same parts in the same arrangement as described above, except that the valve housing 57 has inlet and outlet connections of the so-called straight-line type. The housing is thus formed with a similar seat 58, but is extended beyond the seat to provide an inlet connection 59 having an attaching flange 60. The outlet 61 is substantially as described above, having a flange 62 for line connection. This modification, therefore, provides an essentially straight-line flow, while the flow through the flush valve described above changes direction by angle of about 45° with a full sweeping curve.

It will be noted that both modifications afford a full flow area at least as large as the cross sectional flow area of the container or line with which the valves are connected, thus assuring a full expected discharge rate and minimum loss of head.

It will thus be seen that the invention accomplishes its objects, and while it has been herein disclosed by reference to the details of a preferred embodiment, it is to be understood that such disclosure is intended in an illustrative, rather than a limiting sense, as it is contemplated that various modifications and changes in the construction and arrangement of the parts will readily occur to those skilled in the art within the spirit of the invention and the scope of the appended claims.

I claim:

1. In a valve for transmitting corrosive fluids, the combination of a metal valve stem, a metal sleeve surrounding and fixed on said stem to protect the same against corrosion, said sleeve being provided externally with a vitreous protective coating fused thereon and internally with a surface bearing on said stem, a valve head formed at one end of said stem and sleeve and having a surface of corrosion-resisting material, and means at the opposite end of said stem and sleeve for engagement by a valve actuating means.

2. In a valve for transmitting corrosive fluids, the combination of an uncoated metal valve stem, a metal sleeve surrounding and fixed on said stem to protect the same against corrosion, said sleeve having a vitreous coating fused on the external surface thereof and having an internal diameter larger than the outer diameter of said stem with spaced uncoated surfaces closely fitting said stem, a valve head at one end of said stem and sleeve provided with a surface of corrosion-resisting material, and means at the other end of said stem and sleeve for engagement by a valve actuating means.

3. In a valve for transmitting corrosive fluids, the combination of a corrodible metal valve stem, a corrodible metal sleeve surrounding said stem, said sleeve being provided externally with a vitreous coating fused thereon and internally with a surface bearing on said stem, a corrodible metal valve head formed integrally with said sleeve adjacent one end thereof and having a vitreous coating fused on the outer surface thereof, a gasket of yieldable material on said head for engagement with a valve seat, means for securing said gasket on said head, and means at the opposite end of said stem and sleeve for engagement by a valve actuating means.

4. In a valve for transmitting corrosive fluids, the combination of a metal valve stem, a metal sleeve surrounding said stem intermediate the ends thereof, said sleeve having a vitreous coating fused on the outer surface thereof and having an inner surface of larger diameter than said stem and engaging said stem at spaced bearing surfaces, a metal valve head formed integrally at one end of said sleeve and having a vitreous coating fused on the outer surface thereof, a gasket of yieldable material provided with means for securing the same to said head for engagement with a valve seat, and means on the opposite end of said stem for engagement by a valve actuating means.

5. In a valve for transmitting corrosive fluids, the combination of a metal valve stem, a metal sleeve surrounding said stem intermediate the ends thereof, said sleeve having a vitreous coating fused on the outer surface thereof and having an inner surface of larger diameter than said stem and engaging said stem at spaced bearing surfaces, a metal valve head formed integrally at one end of said sleeve and having a vitreous coating fused on the outer surface thereof, a gasket of yieldable material on said valve head, a metal cap threaded on one end of said stem and having a vitreous coating fused on the outer surface thereof for holding said gasket on said head and said head against movement longitudinally on said stem, a nut threaded on said stem for holding the opposite end of said sleeve against movement thereon and a threaded portion on the end of said stem opposite said head for engagement by a valve actuating means.

6. In a valve for transmitting corrosive fluids, the combination of a corrodible metal valve stem, a corrodible metal sleeve surrounding said stem, said sleeve being provided externally with a vitreous coating fused thereon and internally with a surface bearing on said stem, a corrodible metal valve head formed integrally with said sleeve with a seating surface extending normally to said sleeve, said valve head having a vitreous coating fused on the outer surface thereof, a gasket of yieldable sheet material on said seating surface, means threadedly engaging said stem at opposite ends of said sleeve for holding said gasket on said surface and said sleeve against movement longitudinally of said stem, and a part at the end of said stem opposite said head for engagement by means actuating said stem and head.

RUDOLPH F. GOECKE.

REFERENCES CITED

The following references are of record in the file of this patent:

UNITED STATES PATENTS

| Number | Name | Date |
| --- | --- | --- |
| 192,658 | Powell | July 3, 1877 |
| 1,311,954 | Dally | Aug. 5, 1919 |
| 1,840,904 | Julien | Jan. 12, 1932 |
| 1,923,306 | Hagen | Aug. 22, 1933 |
| 1,947,257 | Fritz | Feb. 13, 1934 |

FOREIGN PATENTS

| Number | Country | Date |
| --- | --- | --- |
| 1,483 | Great Britain | 1881 |
| 156,922 | Great Britain | 1919 |
| 248,858 | Italy | 1926 |
| 262,594 | Great Britain | 1925 |